United States Patent Office 2,752,664
Patented July 3, 1956

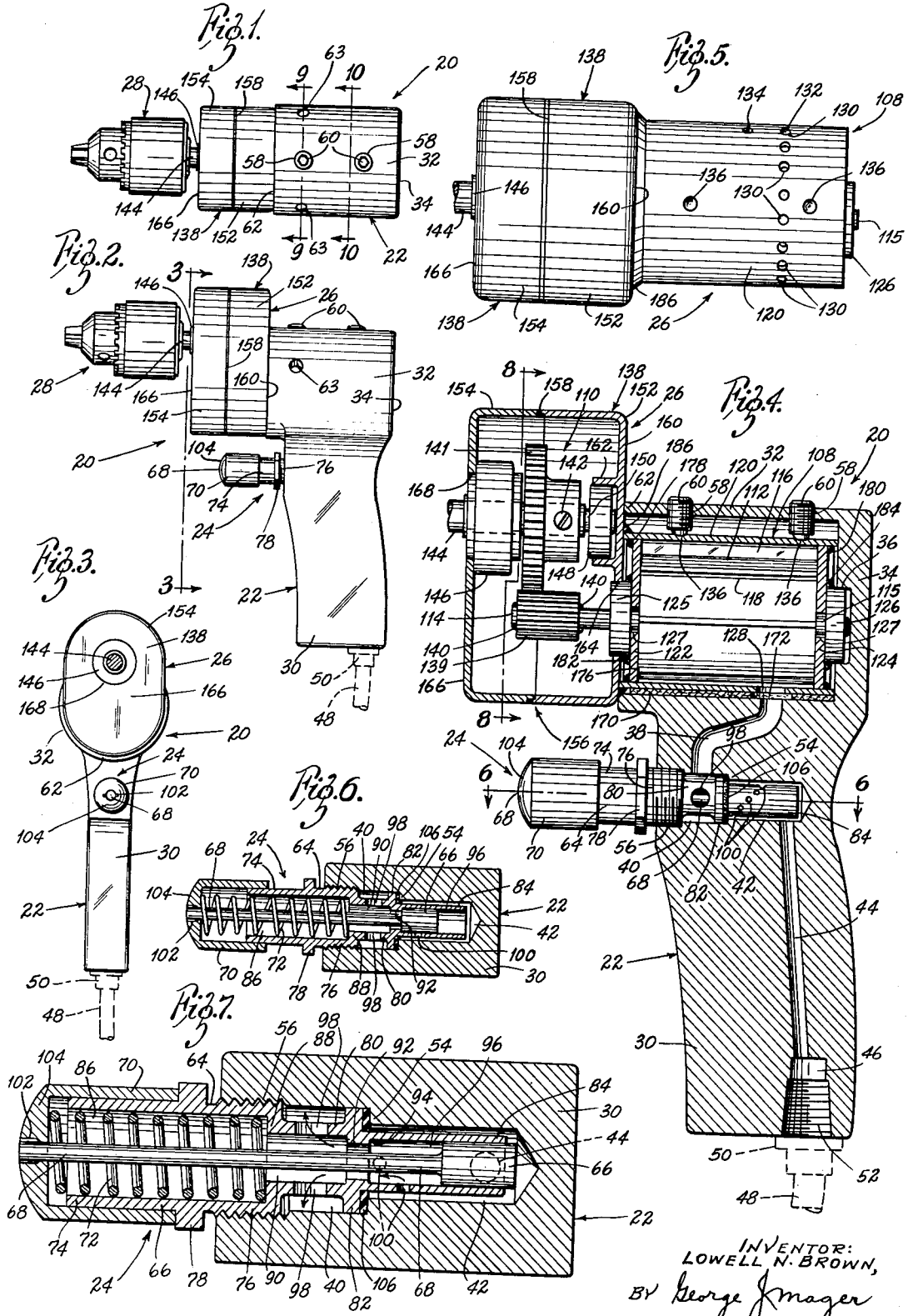

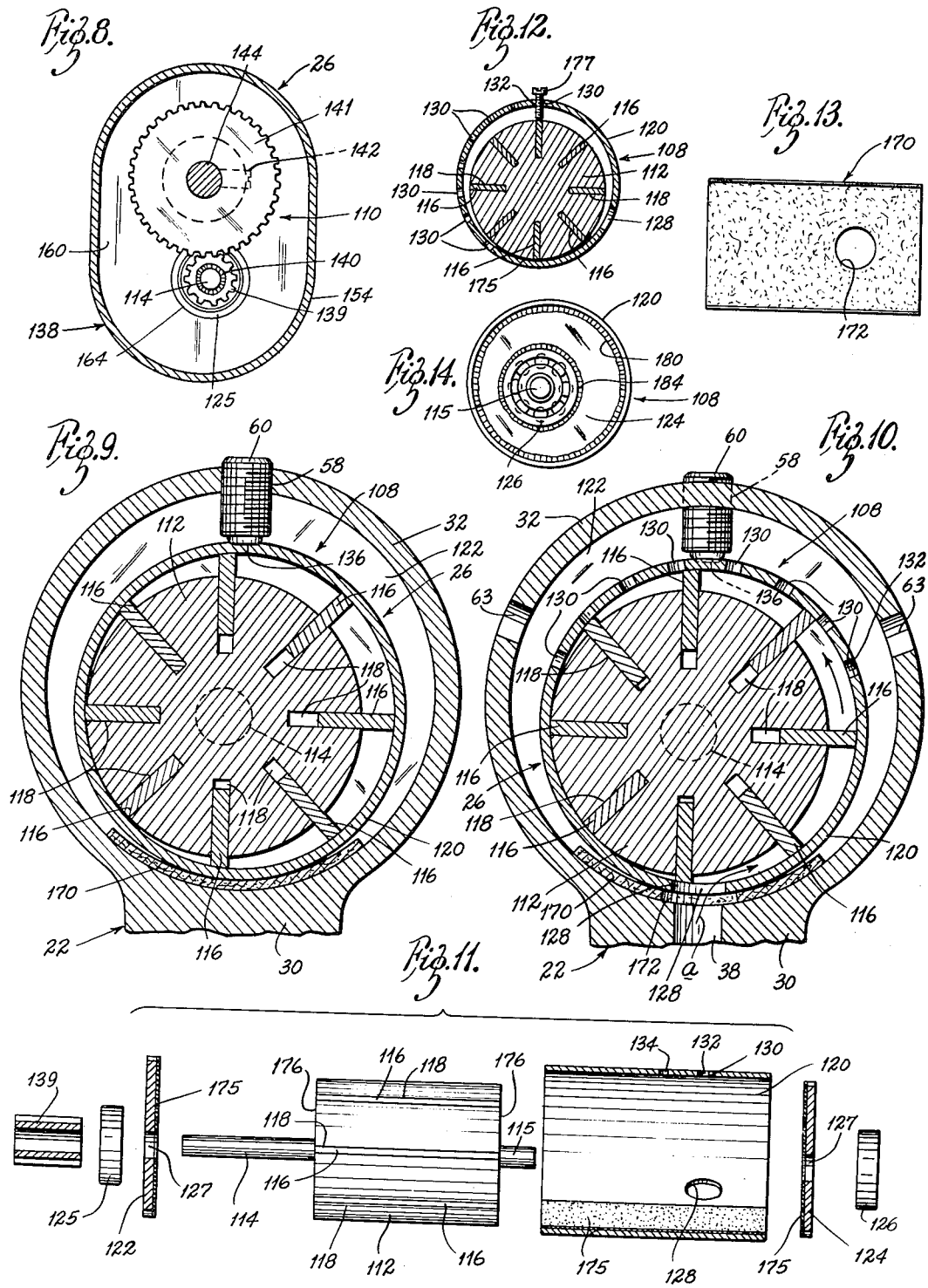

2,752,664

ROTARY HAND DRILL

Lowell N. Brown, Overland, Mo.

Application February 17, 1954, Serial No. 410,910

1 Claim. (Cl. 29—156.4)

The present invention relates generally to fluid pressure actuated tools, and more particularly, to new and useful improvements in the construction of portable tools that are operable by means of air under pressure.

Specifically, this invention concerns an improved pneumatic hand drill, and a novel method for assembling the rotary engine incorporated therein.

The external configuration of the drill simulates that of a pistol, thus facilitating handling and operation thereof. That is to say, the drill includes a handle member associated with a barrel-like assembly of elements generally normal to said handle member. In consequence, a bit that is clamped in a drill chuck which the invention incorporates may be directed horizontally, perpendicularly, or angularly, as is understood.

Heretofore, rotary drills of the type under consideration have presented a considerable problem from a manufacturing standpoint. Precision machining of the actuatable elements, and the minute tolerances requisite for smooth and effective operation, resulted in a manufacturing expense that has been found prohibitive, generally speaking. In other words, precise predetermined dimensioning, particularly with respect to the rotor assembly, has heretofore been of critical importance.

Stated otherwise, prior to the teachings of the present invention, the manufacture and assembly of the elements constituting the rotary engine for drills of the type under consideration was a laborious process, and invariably resulted in a construction that proved noisy in operation.

The primary object of the present invention is to provide a highly efficient hand drill that is actuatable by air pressure, and which incorporates a rotary engine that may be assembled in simple fashion, whereby to reduce manufacturing costs to a considerable extent.

A further object related to the primary object of the invention is to teach a novel method for accomplishing assembly of the elements comprising the rotary engine in a simple manner that insures provision of extremely close yet adequate tolerances in the ultimate construction.

Another object is to provide, in a drill of the type under consideration, a rotary engine that comprises a self-contained unit capable of smooth and efficient operability at high as well as at low speeds.

Another object of the invention is to provide a self-contained transmission unit wherein a suitable lubricant is sealed, and means for permanently joining the said rotary engine and transmission units in complementary disposition to positively and effectively activate a driven shaft whereon the drill chuck is mounted.

A manually operable air pressure control assembly is incorporated for incrementally increasing or decreasing the rotary speed of the bit when the drill is in operation, as will appear.

The drill of the present invention is primarily designed for drilling holes in metallic elements, but it is to be understood that said drill may be employed in like capacity with respect to wooden or plastic elements, and so on.

A more comprehensive understanding of the invention and its mode of operation may be had from the detailed description thereof to follow with reference to the accompanying drawings, wherein—

Figure 1 is a view in top plan and on a reduced scale, of a pneumatically operable rotary hand drill incorporating the present invention;

Figure 2 is a side elevational view thereof;

Figure 3 is a left end view taken on the line 3—3 of Figure 2;

Figure 4 is an actual size vertical sectional view taken longitudinally of the drill, a conventional chuck assembly being omitted;

Figure 5 is a top plan view of the composite sealed transmission and rotary engine units of the invention;

Figure 6 is a sectional plan view taken on the line 6—6 of Figure 4, illustrating the air control valve assembly in fully closed disposition;

Figure 7 is an enlarged reproduction of Figure 6 illustrating said air control valve assembly in fully open disposition;

Figure 8 is a vertical sectional view taken on the line 8—8 of Figure 4;

Figure 9 is a fragmentary transverse sectional view on an enlarged scale, taken on the line 9—9 of Figure 1;

Figure 10 is a view similar to Figure 9, taken on the line 10—10 of Figure 1;

Figure 11 is an exploded view of the rotary engine unit of the invention, exhibiting on an exaggerated scale, a film or coating of a soluble substance applied to certain surfaces of included elements in accordance with the concepts of the invention;

Figure 12 is a vertical sectional view demonstrating the novel manner whereby the rotor is maintained in place during the process of assembling the rotary engine unit;

Figure 13 is a top plan view of a gasket member formed of fibrous or other semi-rigid material; and Figure 14 is an elevational view of the right hand end of the Figure 5 assembly.

The rotary hand drill that incorporates the present invention is generally designated in Figures 1 through 4 by the numeral 20. The drill 20 includes a handle member generally designated 22; a manually operable air pressure control assembly generally designated 24; a combined transmission and rotary engine assembly generally designated 26; a suitable conventional drill chuck assembly 28; and other elements and associated parts to be described in more detail hereinafter.

As seen to best advantage in Figure 4, the handle member 22 comprises a hand grip section 30 integrally formed with a hollow cylindrical section 32. As viewed in the drawings, the left hand end of said cylindrical section is open, whereas the right hand end thereof is closed by an integral vertical wall 34.

Formed in the inner face of the wall 34, is a circular recess 36, that is non-concentrically disposed relatively to the longitudinal centerline of the cylindrical section 32. Numeral 38 designates an air pressure passageway formed partly in said cylindrical section, and partly in the hand grip section 30, as shown. The lower end of said passageway opens into an annular chamber 40 in horizontally spaced alignment with an annular air supply or intake chamber 42 provided in the grip section 30.

Air under pressure is constantly supplied to the chamber 42 via passageway 44, inlet 46, and a flexible conduit or line 48, that leads from a suitable source of supply. The air pressure supply line 48 is shown in broken lines, and terminates at its delivery end in a suitable fitting 50 adapted to engage the internally threaded portion 52 of inlet 46.

As most clearly shown in Figure 7, chamber 42 is reduced in diameter relatively to chamber 40, whereby to provide an annular shoulder 54, and the left hand end portion of chamber 40 is internally threaded as at 56. And as best seen in Figure 4, the top wall portion of cylindrical section 32 has formed therein on the vertical centerline thereof, a pair of longitudinally spaced internally threaded apertures 58, each adapted to receive a set screw 60 for a reason to appear. The open end of said cylindrical section is defined by a perpendicular circular surface or rim portion designated by the numeral 62. The cylindrical section 32 is also provided with a pair of radial openings 63, the purpose of which will appear hereinafter.

The manually operable air pressure control assembly 24 comprises a self-contained unit that may be quickly removed from, and inserted into the grip section 30 of the handle member. The assembly 24 includes a hollow valve plug 64; a piston-shaped valve member 66; a valve stem 68; a cup-shaped finger-piece 70; and a compression spring 72. As viewed in the drawings, the plug element 64 includes integrally a cylindrical left end segment 74; an externally threaded portion 76; a polygonal flange 78; a cylindrical section 80 of reduced external diameter relatively to the threaded portion 76; a circular flange 82 having a sliding fit in annular chamber 40; and a cylindrical right hand segment 84 that extends freely into intake chamber 42.

Internally, the plug element 64 has formed therein from left to right: a bore 86; a first annular shoulder 88; a counterbore 90; a cylindrical opening 92; a second annular shoulder 94; and a bore 96 provided in segment 84.

The cylindrical section 80 of the plug body is provided with one or more radial ports 98, two diametrically opposite ports being illustrated, and preferable. Formed in segment 84, is a plurality of diagonally spaced radial ports 100, as best seen in Figure 4.

The valve member 66 is integrally formed on the right end of stem 68, and is reciprocable in bore 96. Finger piece 70 is slidably disposed on the segment 74 of the plug 64, and is rigidly secured to the left end of the stem 68, as suggested at 102. The bottom wall 104 of the cup-shaped member 70 is preferably rounded as shown, and the compression spring 72 is interposed in bore 86 about stem 68, between said bottom wall and the above-mentioned annular shoulder 88.

Preferably as the drawings indicate, a rubber or neoprene washer 106 is interposed about segment 84 between plug flange 82 and handle section shoulder 54, to safeguard against leakage of air pressure past flange 82, particularly when the drill is not being activated. The compression spring 72 continually biases the piston element leftwardly, so that in the absence of manually applied pressure to the finger-piece 70, the piston element 66 covers all of the ports 100, thus preventing delivery of air pressure to the cylinder 32.

The combined transmission and rotary engine assembly 26 that appears per se in Figure 5, is removably secured in the cylindrical section 32 by means of the set screws 60 aforesaid. Said assembly 26 includes a pneumatically operable rotary engine generally designated 108, and a transmission similarly designated 110.

The components of the engine 108 include: a rotor 112; a leftwardly projecting drive shaft 114 integral therewith; a rightwardly projecting trunnion 115 also integral with said rotor; a circular series of vanes 116 each disposed for centrifugal radial movements in one of a similar series of slots 118 provided therefor in said rotor; a cylindrical rotor shell or casing 120 having an internal diameter larger than the external diameter of rotor 112; left and right end closure disks 122 and 124 respectively, each having a peripheral diameter corresponding to the internal diameter of casing 120; a conventional ball bearing assembly 125 for rotatably supporting the drive shaft 114; and a similar bearing assembly 126 for rotatably supporting the trunnion 115.

The disks 122 and 124 are identical, and each disk is provided with a circular opening 127 that is non-concentric with the periphery thereof. An air pressure inlet opening 128 of circular configuration is provided in the wall of the casing 120, together with a plurality of circularly spaced exhaust ports 130.

As best seen in Figure 10, the first of this series of ports 130 considered in counter-clockwise succession, is internally threaded as at 132. The casing 120 is further provided forwardly and in longitudinally spaced alignment relatively to said threaded port with an internally threaded opening 134, as shown in Figure 5. Said view also demonstrates the provision of a pair of longitudinally spaced indentations 136 formed in the periphery of casing 120. These indentations are adapted to be engaged by the lower extremities of the set screws 60 in the assembled status of the drill 20, as clearly shown in Figures 4 and 9.

The transmission 110 is enclosed in a housing 138 of a substantially oval configuration. The mechanism of said transmission includes: an elongated pinion 139 that is affixed to the rotary engine drive shaft by solder as indicated at 140 in Figures 4 and 8; a gear 141 meshing therewith and thus adapted to be driven thereby in an opposite direction; a set screw 142 or the like for rigidly securing the gear 140 to a driven shaft 144; a conventional ball bearing assembly 146 to rotatably support the shaft 144 leftwardly of the gear 140; and a conventional ball bearing assembly 148 to rotatably support an integral reduced extension 150 of said driven shaft.

The transmission housing 138 comprises two cup-like sections 152 and 154 that have inter-fitting rim surfaces as portrayed in Figure 4 at 156, and are integrated by means of a peripherally applied ring of solder 158. The bottom wall 160 of transmission housing section 152 is provided with a hollow circular boss portion 162 wherein the ball bearing assembly 148 is supported. Said bottom wall has also formed therein a circular opening 164 adapted to snugly encompass the ball bearing assembly 125. The bottom wall 166 of transmission housing section 154 has formed therein a circular opening 168 adapted to snugly encompass the projecting inner raceway member annulus of the ball bearing assembly 146.

The construction of drill chuck assembly 28 is considered to be outside the purview of the present invention and it has therefore not been illustrated in detail, nor is it deemed necessary to describe the means whereby variously sized drill bits may be removably retained therein.

Portrayed per se in Figure 13, is a generally rectangular gasket 170 preformed of fibrous material or the like. Transversely, the gasket 170 is arcuately contoured as demonstrated in Figures 9 and 10, and it has formed therein on the longitudinal centerline thereof, a circular opening 172 of an appropriate size adapted to surround the inlet opening 128 of casing 120, and the adjacently disposed upper terminus of air pressure passageway 38.

The paramount feature of the present invention stems from the about-to-be described concept of assembling the rotary engine components so as to provide a self-contained unit adapted to be soldered onto the bottom wall 160 of the gear housing 138, whereby to form the composite assembly 26 that is readily insertable into and removable from the cylindrical section 32 of the handle member 22. It is noted at this time that as shown in Figure 4, the circular recess 36 provided in the vertical wall 34 of said cylindrical section accommodates and supports the bearing assembly 126 of the rotary engine.

Assembly of rotary engine

As hereinbefore set forth, manufacturing costs of known hand drills of the instant type are high primarily because of the time factor involved in the process of assembling the precisely dimensioned rotary mechanism incorporated therein.

The present invention teaches a novel method for obtaining close tolerances in a very simple manner, as will now be explained with particular reference to Figures 4, 11, 12, and 14. The following steps are taken: first, a thin coating 175 of a solution, such as a paste mixture of chalk and water, is applied to one face of the disk 122, one face of the disk 124, and with the longitudinally spaced threaded openings 130 and 134 uppermost as suggested in Figure 12, to the inner peripheral surface of the casing 120 between the air pressure inlet opening 128, and the final one of the series of ports 130; thereupon the solution is allowed to dry; then as demonstrated in Figure 12, rotor 112 is positioned in the casing 120 resting by gravity on the dry film 175, the end faces 176 of the rotor being located approximately equally distant from the ends of the casing; a pair of set screws 177, one engaging in the first or threaded port 130 and the other engaging in the threaded opening 134, are then brought into contact with the outer periphery of the rotor whereby to maintain it in the exact eccentric disposition thereof illustrated in Figure 12; the disk 122 is now inserted into the casing with the dry film 175 engaging against the left face 176 of the rotor, the drive shaft 114 extending through and projecting beyond the opening 127; whereupon a circular band of solder 178 is applied along the entire peripheral edge of disk 122 and the inner surfaces of the casing 120 contiguous thereto.

Next, the disk 124 is inserted into the casing, with its dry film 175 engaging against the right face 176 of the rotor and the trunnion 115 extending through and projecting beyond the opening 127; thereupon a circular band of solder 180 is applied along the entire peripheral edge of disk 124 and the inner surfaces of the casing 120 contiguous thereto.

It is noted at this time that the foregoing steps and those to follow are facilitated because the rotor is locked against movement by the screws 177. The ball bearing assembly 125 is next slid along drive shaft 114 until it contacts disk 122, whereupon a circular band of solder 182 is applied along the entire peripheral edge of the outer raceway of said bearing and the contiguous surfaces of said disk. Thereupon the bearing assembly 126 is similarly mounted. That is to say, assembly 126 is slid along trunnion 115 until it contacts disk 124, whereupon a circular band of solder 184 is applied along the entire peripheral edge of the outer raceway of said bearing and the contiguous surfaces of said disk.

From the foregoing, it should now be apparent that a compact self-contained rotary engine will have been assembled that no longer requires the use of the screws 177, wherefore they are removed. A quantity of water is now admitted into the casing 120 via opening 128, and drained therefrom via the ports 130, or vice-versa. In consequence, the three films of chalk 175 are dissolved, whereby to provide permanent appropriate clearances about the rotor. These clearances or tolerances must be close for successful and efficient drilling operations, particularly at high speeds, as is understood. For illustrative purposes, the thicknesses of the coatings 175 have been exaggerated in the drawings. Actually, tolerances of as little as .0001 of an inch may be simply and quickly obtained in accordance with the teachings of this invention.

After the engine has been drained, it is permitted to dry, whereupon the pinion 139 is slid onto the projecting end of the drive shaft 114 and affixed thereto by means of the solder 140, that has been mentioned before. Pinion 139 is elongated, wherefore precise positioning thereof on said drive shaft is not requisite.

The manner of assembling the transmission 110 in housing 138 is deemed clear from an inspection of Figure 4. It should be observed that the longitudinally spaced indentations 136 in the periphery of casing 120 are formed diametrically opposite the inlet opening 128. Consequently as viewed in the drawings, with housing 138 held in perpendicular position, the left end of casing 120 is brought to bear against the wall 160 of the transmission housing with said indentations uppermost, the pinion 139 passing through the opening 164 into mesh with driven gear 141, and the ball bearing assembly 125 seating itself in said opening. Thereupon, a circular band of solder 186 is applied along the entire peripheral edge of casing 120 and the contiguous surfaces of the wall 160.

Thus, the composite transmission and rotary engine unit 26 that is illustrated per se in Figure 5, constitutes an assembly that may readily be inserted and removed from the cylindrical section 32 of the handle member.

In mounting said assembly, the gasket 170 is first positioned in cylindrical section 32 with its opening 172 surrounding the upper end of passageway 38, as clearly shown in Figures 4 and 10. Assuming that the set screws 60 are in engagement with the threaded openings 58, the assembly 26 is inserted by grasping the casing 138 and depositing the attached rotary engine onto the gasket 170 with the indentations 136 uppermost. Thereupon the set screws 60 are rotated to bring their lower extremities into engagement with said indentations 136. The gasket 170 being of a slightly yielding nature, further rotation of the set screws serves to clamp the assembly 26 in operative position, with rotor inlet opening 128 registering with gasket opening 172 and the therebelow upper end of passageway 38.

*Operation*

Assuming that a suitable bit were rigidly clamped operatively in chuck 28, the manner in which a mechanic would employ this drill would seem to be apparent without much further explanation. However, a brief description of the operation is given.

It will be assumed that air under pressure is being constantly supplied to intake chamber 42 from a source not shown, delivery being via line 48, inlet 46, and passageway 44. It will also be assumed that the control assembly 24 is in the normal or closed position thereof demonstrated in Figures 4 and 6, at which time valve member 66 covers all of the diagonally spaced radial ports 100, whereby the air pressure is confined in said chamber 42, as is understood.

Assuming now for example, that a hole is to be drilled at a certain spot in an iron plate, the mechanic grips the handle member 22 and directs the point of the drill bit against the plate at the designated spot. Slight finger pressure now applied to the member 70 will move the valve member rightwardly against the force of compression spring 72 a sufficient distance to uncover the first (from left to right) radial port 100. Consequently, pneumatic pressure flows from chamber 42 through said radial port 100, the cylindrical opening 92, counterbore 90, and ports 98, into annular chamber 40, thence via passageway 38 through the registering openings 172 and 128 into the rotor casing 120.

With reference particularly to Figure 10, it is noted that the rotor 112 and its vanes 116 operate in conventional manner, and that the present invention makes no claim to the construction thereof per se. The pneumatic pressure enters the rotor casing as suggested by the arrow a, whereby energization of the rotor in a counter-clockwise direction is initiated and continues as long as the mechanic's finger applies pressure to the member 170. After serving to impel the rotor, the air exhausts via the ports 130 into cylindrical section 32, thence via openings 63 to atmosphere.

Energization of the rotor 112 effects the rotation of the drive shaft 114 and the pinion 139 affixed thereto. The pinion in turn, effects the clockwise rotation of the gear 141, and the driven shaft 144 to which said gear is rigidly attached. After the bit point has penetrated the surface of the plate wherein a hole is to be drilled, the rotary speed of the drill may be increased by further depression of the finger-piece 70.

In other words, as the finger-piece 70 is caused to move rightwardly, additional ports 100 of the row of diagonally spaced ports in valve plug segment 84 are uncovered, thus increasing the volume of air pressure delivered to the rotary engine, and correspondingly increasing the speed thereof. Conversely, should it be deemed feasible during a drilling operation to decrease the then obtaining speed, finger pressure may be diminished whereby compression spring 72 will automatically effect leftward movement of the valve element 66, thus reducing the volume of air pressure delivered to the rotary engine, and correspondingly reducing the speed thereof.

What I claim is:

The method of producing, for a rotary hand drill of the character described, a self-contained engine assembly including: a rotor; an integral drive shaft projecting from one end of the rotor; an integral trunnion projecting from the opposite end of said rotor; a circular series of vanes each disposed for centrifugal radial movements in one of a circular series of slots provided therefor in the rotor; a cylindrical casing having an internal diameter larger than the external diameter of said rotor; a first end closure disk having a peripheral diameter corresponding to the internal diameter of said casing; a circular opening in the disk non-concentric with the periphery thereof through which said drive shaft projects; a second end closure disk having a peripheral diameter corresponding to the internal diameter of said casing; a circular opening in said second disk non-concentric with the periphery thereof through which said trunnion projects; a first ball bearing assembly to rotatably support the drive shaft; a second ball bearing assembly to rotatably support the trunnion; an air pressure inlet opening and a series of circularly spaced radial exhaust ports in the casing, one of said ports being threaded; and a threaded opening in the casing in longitudinally spaced alignment relatively to the internally threaded exhaust port aforesaid; said method comprising the steps of first applying a thin coating of a solution, such as a paste mixture of chalk and water, to one face of each of said first and second end closure disks; then applying a similar coating, with the longitudinally spaced threaded openings therein uppermost, to the inner peripheral surface of said casing between said air pressure inlet opening and that radial exhaust port therein farthest removed from said threaded openings; permitting the solutions thus applied to dry; thereupon positioning said rotor and the vanes therewith associated within the casing so as to rest by gravity on the dry film of solution, the end faces of the rotor being located approximately equidistant from the ends of said casing; then bringing a pair of set screws each engaging one of said longitudinally spaced internally threaded openings into contact with the periphery of the rotor whereby to temporarily maintain the relative dispositions of the casing and rotor; thereafter inserting said first disk into the casing with the dry film thereon contacting one end face of the rotor and said drive shaft extending through the non-concentric opening of the disk; thereupon applying a circular band of solder along the entire peripheral edge of the disk and the inner surfaces of the casing contiguous thereto; then inserting said second disk into the casing with the dry film thereon contacting the opposite end face of the rotor and said trunnion extending through the non-concentric opening of the second disk; then applying a circular band of solder along the entire peripheral edge of the second disk and the inner surfaces of the casing contiguous thereto; thereupon sliding the first ball bearing assembly onto the drive shaft until it contacts the exposed face of said first disk and applying a circular band of solder along one entire peripheral edge of the outer raceway of said bearing assembly and the surfaces of the first disk contiguous thereto; then sliding the second ball bearing assembly onto said trunnion until it contacts the exposed face of said second disk and applying a circular band of solder along one entire peripheral edge of the outer raceway of said second bearing assembly and the surfaces of the second disk contiguous thereto; thereafter removing the set screws aforesaid; and finally, causing a quantity of water to enter into the casing and drain therefrom via said air inlet opening and exhaust ports whereby to dissipate said dry films and thus provide permanent close tolerances about the rotor within the casing.

References Cited in the file of this patent

UNITED STATES PATENTS 1,860,872    Price et al. _____ May 31, 1932